United States Patent Office 3,749,617
Patented July 31, 1973

3,749,617
METHOD OF BONDING SILICONE RUBBERS TO ORGANIC RUBBERS AND COMPOSITE OBJECT
Roger Fountain, St. Louis, and Gregory M. McLaughlin, Bel Ridge, Mo., assignors to McDonnell Douglas Corporation, St. Louis, Mo.
No Drawing. Filed July 6, 1971, Ser. No. 160,101
Int. Cl. B32b 25/20
U.S. Cl. 156—3                                    7 Claims

ABSTRACT OF THE DISCLOSURE

A process is disclosed whereby silicone rubbers can be bonded to organic rubbers by treating the organic rubber surface with hydrogen peroxide.

BACKGROUND OF THE INVENTION

Silicone rubbers suffer cure inhibition when in contact with organic rubbers, thus a bond between the two classes of rubbers is difficult to obtain. Silicone rubber is defined as being an organosilicone polymer that may be in the form of a sealant or adhesive. Organic rubbers are defined as vulcanized organic polymers (carbon to carbon backbone) such as neoprene and butyl rubbers, etc., and products sold under the trade name Hydrin.

Bonding an organic rubber to silicone rubber is desirable to develop a system of high temperature resistance and high strength by utilizing the high temperature resistance of the silicone rubber with the relatively high resilience and tensile strength of organic rubbers.

Since silicone rubber adhesives and sealants are easily bonded to reinforced plastics (e.g. glass-epoxy, phenolic, polyester, polyimide) and metallic substrates, an organic rubber bonded to silicone rubber offers a strong, resilient, high temperature resistant system which would give environmental protection to reinforced plastics and metal substrates.

U.S. Pat. No. 3,398,043 discloses a method for bonding silicone rubbers to organic rubbers by means of an intermediate layer comprising a mixture of an organic isocyanate and a room temperature vulcanizable silicone elastomer stock. The present application has for its principle object an improvement on Pat. No. 3,398,043 in that the surface of the organic elastomer is treated with a peroxide, thus eliminating the need for the intermediate organic isocyanate layer and utilizing conventional silicone primer systems which are readily available from manufacturers. Furthermore, the present invention provides a high temperature bond between the organic rubber and the silicone rubber which is viable at temperatures up to 500° F., and also has higher peel values and tensile lap shear values than those obtained previously.

Accordingly, another of the principle objects of the present invention is to provide a method for bonding organic rubbers to silicone rubbers without the necessity for special adhesives. Another object is to provide a convenient method for bonding silicone rubbers and organic rubbers utilizing readily obtainable products.

Still a further object is to provide a silicone rubber-organic rubber composite having a bond therebetween which is resistant to high temperatures, up to 500° F. A further object is to provide an organic rubber and silicone rubber composite which at room temperature has peel values of about 10 pounds per inch width and tensile lap shear values of about 80–100 pounds per square inch.

These and other objects and advantages will become apparent hereinafter.

The present invention comprises a method for bonding organic rubbers to silicone rubbers by reacting the surface of the organic rubber with a peroxide and applying a fluid silicone elastomer to the treated surface and curing the same. The present invention further comprises the composite product produced therefrom.

DETAILED DESCRIPTION

U.S. Pat. 3,398,043 contains a detailed listing of numerous patents which describe silicone elastomers suitable for this invention. Pat. No. 3,398,043 also lists many organic substrates, all of which are suitable for use in the present invention. More specifically, the organic elastomer substrate can be a surface of any natural or synthetic organic elastomer such as natural rubber such as balata and gutta-percha and hevea; butadiene-styrene copolymers; butadiene-acrylonitrile copolymers; isobutylene diolefin copolymers; alkylene polysulfides, polychloroprenes (neoprenes); nitrile rubbers; polyisoprene rubbers; acrylic rubbers such as polyethyl acrylate, copolymers of ethylacrylate and 2-chloroethyl vinylether and copolymers of acrylates and acrylonitrile; polyester rubbers such as copolymers of polyesters such as ethylene glycol, 1,2-propylene glycol or 1,4-butanediol and adipic acid and diisocyanates such as 1,5-naphthylene diisocyanate and copolymers of polyester amides such as copolymers of ethylene glycol, monoethanolamine and adipic acid and a diisocyanate such as hexamethylene diisocyanate; a rubber prepared from chlorinated polyetheylene which is reacted with sulfur dioxide and then with metallic oxides, accelerators and organic acids (known as Hypalon S-2 and manufactured by Du Pont); a rubber made from a plasticized copolymer of vinylidene chloride (known as Saran and manufactured by the Dow Chemical Company); copolymers of butadiene and vinylpyridine and rubber made from perfluoroalkylacrylates. Although any of the organic elastomers can be bonded to silicone elastomers by the method of this invention, the advantageous property of this invention is that those organic elastomers, such as neoprene, which were heretofore difficult to bond to silicone elastomers can now be bonded with ease.

The room temperature vulcanized (RTV) silicone elastomer products can be any conventional material such as the RTV 600 series sold by General Electric Co. Suitable room temperature curable silicone elastomer stocks are described in U.S. Pat. Nos. 3,035,016, 3,061,575, 3,077,-465, 3,109,013, 2,833,742, 2,902,467, 2,927,907, 2,983,-694, 3,122,533, 3,170,894 and 3,175,993. Specific examples from each of the foregoing patents are shown in patent No. 3,398,043 and are incorporated herein by reference.

Other room temperature vulcanizable silicone elastomer stocks can be found in U.S. Pat. Nos. 3,065,194, 3,070,-566, 3,109,826, 3,110,689, 3,127,363, 3,133,891, 3,154,-515, 3,165,494 and 3,189,576.

The organic rubber surface is treated with a peroxide, preferably hydrogen peroxide, but other peroxides, dissolved in ice-cold water or aqueous alcohol such as sodium peroxide, disuccinyl peroxide and diethyl peroxide are suitable for use in this invention.

The concentration and application time for the peroxide surface treatment depends on the organic polymeric surface area. For the surfaces and peroxides different from those specifically illustrated in the examples, the concentration and application time of the surface treatment is determined by the optimum or necessary bond strength which results. One skilled in the art, by varying the peroxide concentration and/or time of application, from about 10 to about 40 minutes, can determine the bond strengths obtained from each treatment. This reaction takes place at ambient temperature, i.e. 70–80° F. At elevated temperature the application time is reduced Arrheniusly. The minimum temperature at which one can practically operate is about 50° F. The peroxide reaction is stopped by removal, washing and drying of the organic elastomer.

The preferred process involves treating the vulcanized organic rubber for about 10 to about 30 minutes with an aqueous solution of $H_2O_2$ at a concentration of about 30 to about 40 percent by volume. The preferred temperature is about 75° F.+5° F., but can vary between about 50° F. to about 100° F.

After the organic rubber substrate has been reacted with peroxide and dried, a fluid polysiloxane elastomer is poured onto the treated surface which has been dammed and the entire material is then subject to conventional cures such as vacuum, heat, or the like. The cure conditions may be under ambient or elevated temperature at autoclave, press or atmospheric pressure for a time (½ to about 2 hours) dependent on the cure method. Generally an elevated temperature cure between 300 and 400° F. for 1 to 1½ hours under 50 to 70 p.s.i. gives the highest lap shear bond strengths.

EXAMPLE NO. I

Using the process of this example, we bonded Hydrin 200 cured rubber and the silicone rubber. The organic rubber is first degreased with ethanol. The surface of the organic rubber is dried and treated with a peroxide, e.g., 35 parts by volume $H_2O_2$ for 15 minutes at a temperature of 75±5° F. The surface is washed with distilled water to remove the peroxide and the organic rubber is dried. A suitable substrate, e.g. phenolic, glass-epoxy, etc. is first primed by brush or dip application of the primer, e.g. GE SS–4120 (a low molecular weight polysiloxane resin dissolved in methanol containing an amine component), and dried for 30 minutes minimum at ambient temperature. The silicone rubber after mixing and de-airing for 20 minutes under vacuum, is applied to the primed surface of the substrate. The silicone rubber is RTV 630 made by General Electric Co. which is a room temperature vulcanizable silicone rubber. The organic rubber is laid onto the silicone rubber in a known way, i.e. rolling the part onto the silicone starting from one edge of the organic rubber so as to exclude air. A bond is then achieved by any of the usual curing processes, (e.g. vacuum bag, autoclave, and finger pressure techniques) at ambient or elevated temperature. When cured at 50 p.s.i. autoclave pressure and 350° F. temperature, for 60 minutes, the product has a peel value of about 10 lbs./sq. in. and a tensile lap shear value of about 100 lbs./sq. in.

EXAMPLE NO. 1A

The foregoing procedure of Example No. I is repeated except that the bonding conditions are changed to 26 in. of mercury vacuum pressure and a room temperature cure for 24 hours to produce the same peel values and tensile lap shear values.

EXAMPLE NO. II

As an alternative process for improving the strength of the bond, an organic rubber, for example Hydrin 200, is treated first with an organic polymer/isocyanate dispersion, for example, a "Chemloc" type of adhesive made by Hughson Chemical Company, a division of Lord Corporation. This produces a layer about 0.5 to 1 mil thick on the organic rubber. The treated surface then is dried and subjected to the hydrogen peroxide treatment as hereinbefore described in Example I. The treated surface is laid onto a wet fluid silicone surface and cured. The composite product has a peel value of 10 lbs./sq. in. and a lap shear value of 180 lbs./sq. in. This reaction is used when somewhat higher bond strength is desired, but it requires that the isocyanate be placed on the surface of the organic rubber and that a peroxide treatment be used.

EXAMPLE NO. III

Nordel 1070 (an ethylene-propylene terpolymer made by Dow) is degreased with ethanol, dried and treated with an aqueous solution consisting of 40 parts by volume $H_2O_2$ for 30 minutes at a temperature of 75° F. The surface is washed with distilled water to remove the peroxide and the organic rubber is dried. A phenolic substrate is primed by application of GE SS–4120 and dried. RTV 630 is applied to the primed surface. The treated surface of the organic rubber is laid onto the fluid surface of the silicone rubber so that no air is present between the surfaces. The composite is then cured at 26 in. Hg vacuum pressure and 400° F. temperature for 60 minutes to produce a product which has a peel value of about 10 pounds per square inch and a tensile lap shear value of about 150 to 200 pounds per square inch.

EXAMPLE NO. IV

Neoprene is degreased with ethanol, dried and treated with an aqueous solution consisting of 40 parts by volume $H_2O_2$ for 30 minutes at a temperature of 75° F. The surface is washed with distilled water to remove the peroxide and the organic rubber is dried. A phenolic substrate is primed by application of GE SS–4120 and dried. RTV 630 is applied to the primed surface. The treated surface of the organic rubber is laid onto the fluid surface of the silicone rubber so that no air is present between the surfaces. The composite is then cured at 50 p.s.i. autoclave pressure and 300° F. temperature for 90 minutes to produce a product which has a peel value of 7 pounds per square inch and a tensile lap shear value of 80–100 pounds per square inch.

Generally the methods of the Examples I–IV enable the high strength of selected organic rubbers to be used in bonding applications where temperature resistance and resilience are required. Specifically, this method is being used for bonding organic rubbers onto reinforced plastic, i.e. it offers rain, sand, dust, hail etc. erosion protection to plastic radomes after high temperature (400° F.) exposure. Other uses include the following: High temperature sealant system for automobiles, (e.g. water pump), domestic appliances, astronautic application for a bonding seal of organic rubbers, and applications that require a rubber to rubber bond.

Thus, it is seen that the present invention achieves all of the objects and advantages sought therefor.

What is claimed is:

1. A method of bonding an organosilicone polymer to a vulcanized organic polymer comprising the steps of:
    (a) treating the surface of the vulcanized organic polymer to be bonded by applying a peroxide thereto,
    (b) removing the peroxide from the treated surface of the vulcanized organic polymer, before applying the organosilicone polymer thereto,
    (c) applying a curable fluid organosilicone polymer to the treated peroxide free surface, and
    (d) curing the organosilicone polymer to a solid that is bonded to the vulcanized organic polymer surface.

2. The method of claim 1 wherein the vulcanized organic polymer is treated with $H_2O_2$ at a concentration of 30 to 40% by volume for 10 to 30 minutes at a temperature of 70 to 80° F.

3. The method of claim 1 including the step of building a dam around the peroxide treated surface of the vulcanized organic polymer to receive and retain the curable fluid organosilicone polymer.

4. The method of claim 1 wherein the fluid organosilicone polymer is cured for about ½ to about 2 hours under a pressure of about 50 to about 70 p.s.i. and at a temperature of about 300 to about 400° F.

5. The method of claim 1 wherein the organic polymer is treated with $H_2O_2$ of a concentration of between about 30 to about 40% by volume for about 10 to about 40 minutes at a temperature of about 70–80° F. until the surface is reacted, damming around the surface, placing the fluid curable organosilicone polymer onto the reacted surface within the dam, and curing the organosilicone polymer to a solid for a period of up to 24 hours at a temperature of 70–80° F. and a pressure of 1 atmosphere.

6. The method of claim 1 wherein the bond between the organic polymer and the organosilicone polymer has a peel value of at least about 10 lbs./in. width and a tensile lap shear value of at least about 80 lbs./sq. in.

7. The process of claim 1 wherein the vulcanized organic polymer is treated with $H_2O_2$ for about 10 to about 4 minutes at a temperature of about 50 to about 100° F.

References Cited

UNITED STATES PATENTS

| | | | |
|---|---|---|---|
| 2,639,276 | 5/1953 | Smith-Johannsen | 156—329 |
| 3,108,898 | 10/1963 | Nitzsche et al. | 156—329 X |
| 3,293,093 | 12/1966 | Jones et al. | 156—3 X |
| 3,379,607 | 4/1968 | Foster et al. | 156—329 X |
| 3,398,043 | 8/1968 | Youngs | 161—190 |
| 3,567,493 | 3/1971 | Wessel | 156—308 X |
| 3,702,778 | 11/1972 | Mueller et al. | 161—206 X |

HAROLD ANSHER, Primary Examiner

U.S. Cl. X.R.

156—308, 315; 161—208

UNITED STATES PATENT OFFICE
CERTIFICATE OF CORRECTION

Patent No. 3,749,617            Dated July 31, 1973

Inventor(s)   Roger Fountain, and Gregory M. McLaughlin

It is certified that error appears in the above-identified patent and that said Letters Patent are hereby corrected as shown below:

Column 2, lines 63-65 should read "The concentration and application time for the peroxide surface treatment depends on the organic polymeric surface being treated and its surface area." instead of "The concentration and application time for the peroxide surface treatment depends on the organic polymeric surface area."

Claim 7, line 3 "4" should be "40".

Signed and sealed this 20th day of November 1973.

(SEAL)
Attest:

EDWARD M. FLETCHER, JR.          RENE D. TEGTMEYER
Attesting Officer                 Acting Commissioner of Patents